United States Patent [19]

Hart et al.

[11] Patent Number: 4,527,513

[45] Date of Patent: Jul. 9, 1985

[54] POULTRY WATERER

[75] Inventors: Felix Hart, Leesburg; Devon Eby, Nappanee, both of Ind.

[73] Assignee: CTB, Inc., Milford, Ind.

[21] Appl. No.: 601,038

[22] Filed: Apr. 16, 1984

Related U.S. Application Data

[63] Continuation-in-part of Ser. No. 553,844, Nov. 21, 1983, abandoned.

[51] Int. Cl.³ ............................................. A01K 39/04
[52] U.S. Cl. .............................. 119/51.5; 119/52 AF; 119/72
[58] Field of Search ...................... 119/52 R, 72, 51.5, 119/52 AF

[56] References Cited

U.S. PATENT DOCUMENTS

| | | | |
|---|---|---|---|
| 3,306,262 | 2/1967 | Hart | 119/72 |
| 3,942,479 | 3/1976 | Powers | 119/52 R |
| 4,401,057 | 8/1983 | Van Gilst | 119/51 R |
| 4,441,459 | 4/1984 | Giordano | 119/72 |
| 4,476,811 | 10/1984 | Swartzendruber | 119/52 AF |

Primary Examiner—Hugh R. Chamblee
Attorney, Agent, or Firm—Trexler, Bushnell & Wolters, Ltd.

[57] ABSTRACT

A novel poultry watering device, and a combined watering and feeding system are disclosed. In a first embodiment, the water device or station includes a support tube, at least one water-holding cup disposed for access by poultry, and water conduit means carried by the support tube and extending from a water line to the water-holding cup. In a second embodiment, the water conduit means is suspended from a pivoting clamp arrangement beneath a feed conveyor. The system includes a plurality of discrete feeder pan units connected to the feed conveyor and disposed to present feed to the poultry. The water line can conveniently be located generally adjacent the feed conveyor. A number of water dispensing stations of the type described are also provided. These water dispensing stations have their support tubes or clamps carried by the feeder conveyor. In this way, the water dispensing stations and feed pan units are all disposed at the same level. The entire system can thus be used to provide feed and water to very small chicks, or to adult poultry.

16 Claims, 13 Drawing Figures 4,527,513

POULTRY WATERER

BACKGROUND OF THE INVENTION

This application is a Continuation-in-Part of our earlier application, Ser. No. 553,844, filed Nov. 21, 1983, now abandoned.

This invention relates generally to combined systems for feeding and watering animals, and more particularly relates to a combined feeder and waterer system for poultry and the like which can be automatically adjusted to serve very young chicks, or to serve adult birds.

Among the important parts of such automated feeding systems are the feeder units or feeder pans. Patents disclosing such feeders are U.S. Pat. Nos. 3,911,868 and 4,070,990 and U.S. application Ser. No. 428,847 filed Sept. 30, 1982.

Automated watering systems are also important. A patent disclosing such a watering system is U.S. Pat. No. 4,282,831.

When raising broiler flocks from young chicks, poultry husbandmen want feeding and watering systems which will accommodate young chicks and will encourage them to find and eat the presented feed and water. The husbandmen also want a feeder which will provide adequate amounts of feed to mature birds, yet which will discourage feed wastage. Such a feeder is disclosed in the '847 patent application, and is now being offered by Chore-Time Equipment, Inc. of Milford, Ind. Similarly, husbandmen also want a watering system which will not become clogged or befouled by mature birds. Such a system is suggested in the '831 patent cited above. It is accordingly the general object of the invention to provide a watering device which will meet these needs.

It is another object to provide a low-cost yet effective combined feeder and waterer system which can be used by very young birds in one configuration and which can be used by adult birds in another configuration.

A more specific object is to provide such a combined feeder and waterer system which can be automatically reconfigured. A related object is to provide such a combined system which can be raised out of the way for flock collection and housing cleaning.

Another specific object is to provide such a combined system which will accommodate a satellite watering system for providing water to small birds.

Other objects and advantages of the invention will become apparent upon reading the following detailed description and upon reference to the drawings. Throughout the description, like reference numerals refer to like parts.

DETAILED DESCRIPTION

While the invention will be described in connection with preferred embodiments and configurations, it will be understood that it is not intended to limit the invention to those embodiments or configurations. On the contrary, it is intended to cover all alternatives, modifications and equivalents as may be included within the spirit and scope of the invention as defined by the appended claims.

Figures 1, 2:
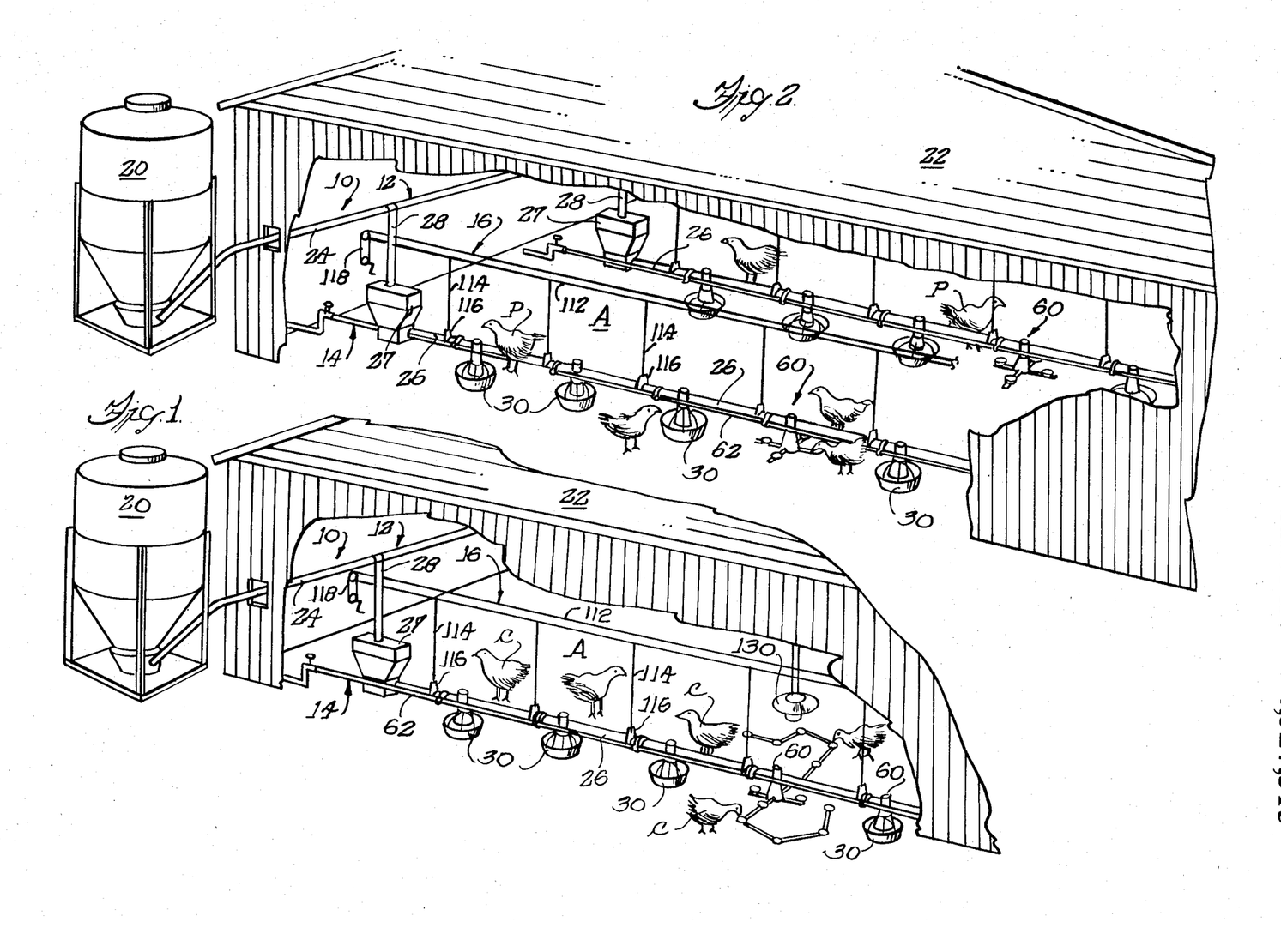
FIG. 1 is a fragmentary general perspective view showing the novel combined feeder and waterer system as it appears when configured for use by young poultry.
FIG. 2 is a fragmentary perspective view similar to FIG. 1 but showing the system as it appears when configured for use by adult birds.

Turning first to FIGS. 1 and 2, there is shown the novel combined feeding and watering system 10 as it appears in its general aspect. In general, this feeding and watering system 10 can be considered to include a feeding sub-system 12 and a closely associated novel watering sub-system 14. These two sub-systems 12 and 14 are positioned for poultry access by a suspension sub-system 16.

Figure 3:
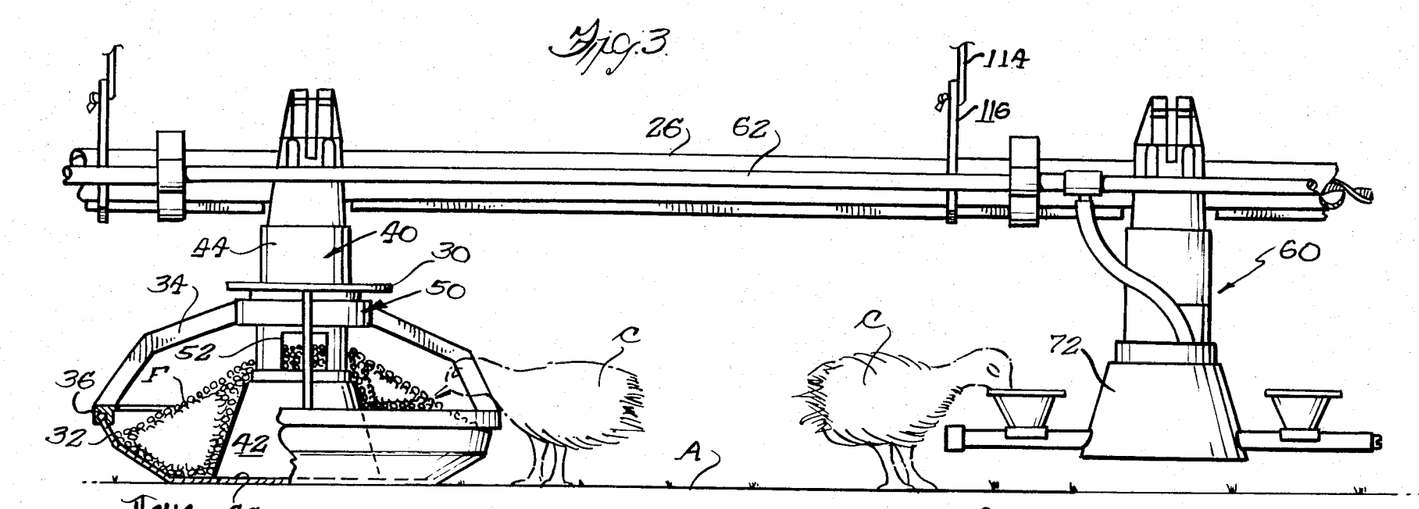
FIG. 3 is a fragmentary side elevational view showing the system, in further detail, as it appears when configured for use by young poultry.
Figure 4:
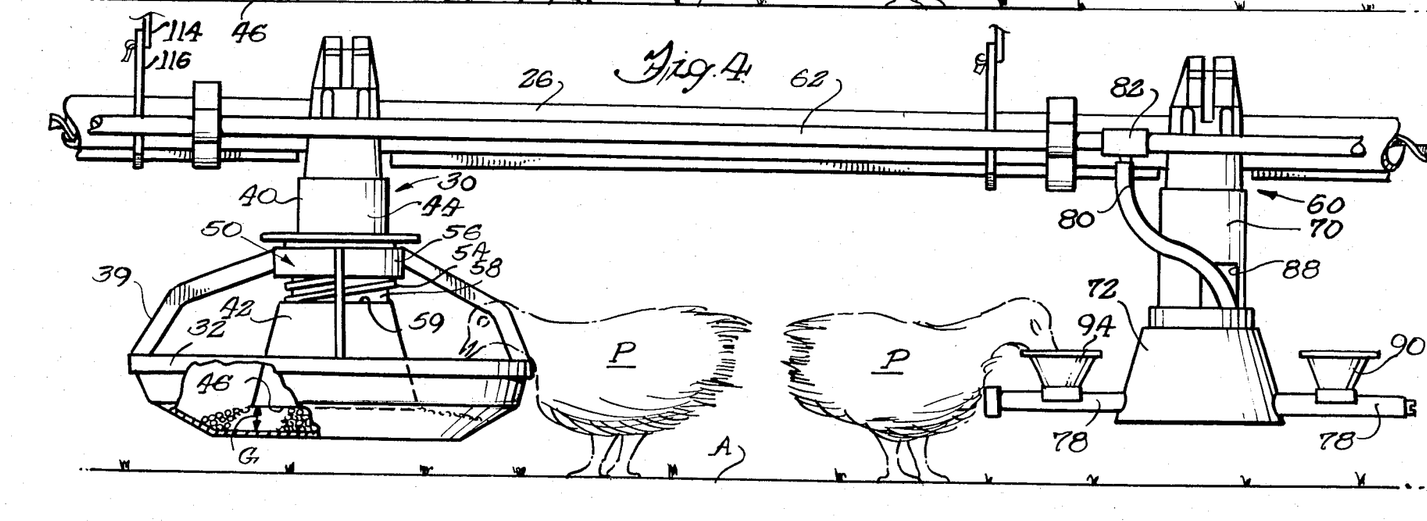
FIG. 4 is a fragmentary side elevational view similar to FIG. 3 but showing the system as it appears when configured for use by adult birds.

The feeding sub-system 12 illustrated here includes a bulk storage bin 20, which can be located outside a poultry house 22. It will be noted that this poultry house 22 defines a more or less enclosed ground area A in which the fowl are free to roam about. (It will be understood that the fowl can be either adult birds P shown in FIG. 2, or they can be immature chicks C shown in FIG. 1.) A header conveyor 24 extends into the house 22 and provides a particulate feed mix to cross line conveyors 26 through bins 27 and drop tubes 28. A plurality of discrete feeder pan units 30 are connected to the feed conveyor 26 and are disposed on or just above the ground area A so as to present feed to the poultry C or P. These feeder pan units 30 are adapted to assume one configuration for providing feed to immature poultry C as shown in FIG. 3, and to assume another configuration when they are raised above the floor area A so as to provide a lesser but controlled and attractive amount to adult birds P as shown in FIG. 4.

The feeders 30 shown in FIGS. 1–4 can be of the type disclosed in U.S. patent application Ser. No. 428,847 filed Sept. 30, 1982. Each feeder 30 includes an underlying pan member 32 shaped for retaining and presenting delivered feed. A grill arrangement 34 overlies the pan 32 and is connected to the pan 32 with sufficient interengagement strength to permit the pan 32 to be lifted by the grill 34 when the grill is raised or picked up, as described below. This interengagement arrangement can include an interlocking pan rim and grill rim mechanism 36, as suggested in FIG. 3.

In the center of the unit 30, a drop tube 40 extends from the conveyor 26 down into the pan 32. As can be envisioned from FIGS. 3 and 4, feed delivered by the conveyor 26 through a tube hole (not shown) falls down the interior of the drop tube 40 and into the pan 32. Here, this drop tube 40 terminates at a distal end (not shown), and a skirt 42 of generally conical configuration extends away from the main drop tube cylinder 44 to a skirt distal end 46. To minimize expense, the skirt 42 can be formed integral with the other portions of the drop tube device 40.

A collar assembly 50 surrounds the drop tube 40 and is held above the pan 32 by the grill work 34.

The illustrated feeder can be used to present feed to either immature poultry C as illustrated in FIG. 3, or to older, larger, more mature birds P as shown in FIG. 4. To accomplish this, a brood gate opening 52 is defined in the drop tube cylinder 44 above the skirt 42. A relatively uniform quantity of feed can be provided around the entire circumference of the pan by defining two, three, or more feed brood gate openings in the drop tube means.

The drop tube 40 is sized and shaped so that, when it is moved downwardly to a first non-pan-carrying position as shown in FIG. 3, the drop tube skirt distal end 46 substantially engages the pan 32, thereby inhibiting feed flow into the inner portion of the pan from the bottom of the drop tube 40. Rather, a feed flow route is established from the conveyor 26 through the upper interior portion of the drop tube 40, then out the exposed or unmasked brood gate opening 52, and then down the outside of the skirt 42 to an outer pan area. By dispensing a relatively large amount of feed through the brood gate opening 52 in this way, the feed F can be accumulated and displayed in the position and manner shown in FIG. 3 so that the immature poultry or chicks C can find it and consume it. Conveniently, this feeder configuration is obtained by permitting the pan 32 to rest on the poultry house floor A, and by permitting the drop tube 40 to slide down through the loose adjacent portions of the collar assembly 50 so as to rest the skirt distal end 46 in and on the pan 32. As feed builds up in the pan 32, the brood gate opening 52 is covered by previously dispensed feed; in this way, excess feed delivery and build-up is discouraged, and feed wastage is inhibited.

After the chicks C have grown for, say, five to ten days, they are able to reach interior portions of the feeder 30, and to obtain feed from even a slightly elevated pan. Accordingly, the drop tube 40 can be raised by raising the conveyor tube 26 through use of the suspension system 16 (FIGS. 1 and 2). Raising the drop tube 40 will automatically reconfigure the feeder 30 for use by the more mature poultry.

When the drop tube 40 is raised into the second, pan-carrying positions shown in FIG. 4, the brood gate opening 52 is masked by the collar 50 and the drop tube skirt distal end 46 is pulled up and away from the pan 32. Under these circumstances, a feed gate opening space G is defined between the drop tube distal end 46 and the pan 32. Feed is thus permitted to flow from the conveyor 26 through upper and lower interior portions of the drop tube 40, then past the skirt distal end 46 and into an inner pan area where it can be reached for consumption by the relatively mature poultry P as shown in FIG. 4. The mature birds P have learned to eat from the various pans 32, of course, and the described design of the feeder unit 30 tends to locate feed at the pan interior so as to inhibit the birds from tossing, and wasting the feed.

To precisely adjust the size of the gate G, a screw thread cam arrangement 54 can be provided which adjusts the position of an outer cam element 56 connected to the grill 34 and pan 32 relative to an inner cam element 58 which loosely surrounds the drop tube 44. When the pan 30 is raised, a drop tube shoulder 59 engages this inner element 58 and causes the pan 32 to be lifted. It is contemplated that the parts of this pan unit 30 can be formed of a suitable resinous plastic such as Hercules 7523 polypropylene or Shell Chemical 7522 polypropylene by any of several known molding processes.

The novel watering sub-system 14 includes delivery devices 60 located in close proximity to the feeder 30, as especially indicated in FIGS. 1-4, and a water line 62 located generally closely adjacent the feed conveyor 26. Here, a number of water dispensing station devices 60 are interposed between the feeder pan units 30, and are disposed to present water to the infant or adult poultry C or P. To provide a balanced availability of water and feed in accordance with one aspect of the invention, one watering station 60 is preferably provided between each group of three feeding units 30, as suggested in FIGS. 1 and 2.

Figure 6:
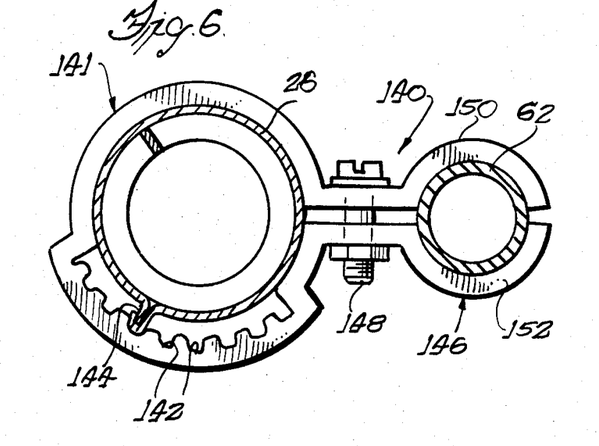
FIG. 6 is a fragmentary sectional view taken substantially in the plane of line 6—6 in FIG. 5.

To conserve space and provide a unitized system in accordance with the invention, the water line 62 is closely associated with the feed conveyor tube 26. This close association can be provided by the special hanger device 140 illustrated in FIGS. 6, 11 and elsewhere. One end 141 of the clamp or hanger 140 device is provided with notches 142 to accept the radially extending seam or flange 144 forming or closing the conveyor tube 26. In this way, the clamp 140 can be mounted at any desired angular position relative to the conveyor tube 26. Opposite portions 146 of the clamp 140 surround and support the water line 62. A convenient fastener 148 such as a bolt can be provided to lock the opposed portions 150, 152 of the clamp 140 in their supporting, surrounding, retaining positions as illustrated. Preferably, the water line 62 is relatively thin and flexible; and the clamp portions 146 support the water line 62 with a relatively loose slip fit. This loose support slip fit arrangement permits the water line 62 to slide axially, and to expand and contact, relative to the support or clamp portions 146. This minor movement of the water line 62 relative to the hanger support 140 can be caused by temperature changes in the line due to thermal variations in the water inside the line.

Preferably the water-dispensing stations 60 are mounted at positions on the feed conveyor 26 which are ordinarily provided with feed drop-out apertures 64. To cover these apertures 64 and consequently prohibit the loss of feed from the conveyor 26 through the watering stations in the first embodiment of the invention, small sleeves 66 are installed on the conveyor 26 over the holes 64.

Figure 5:
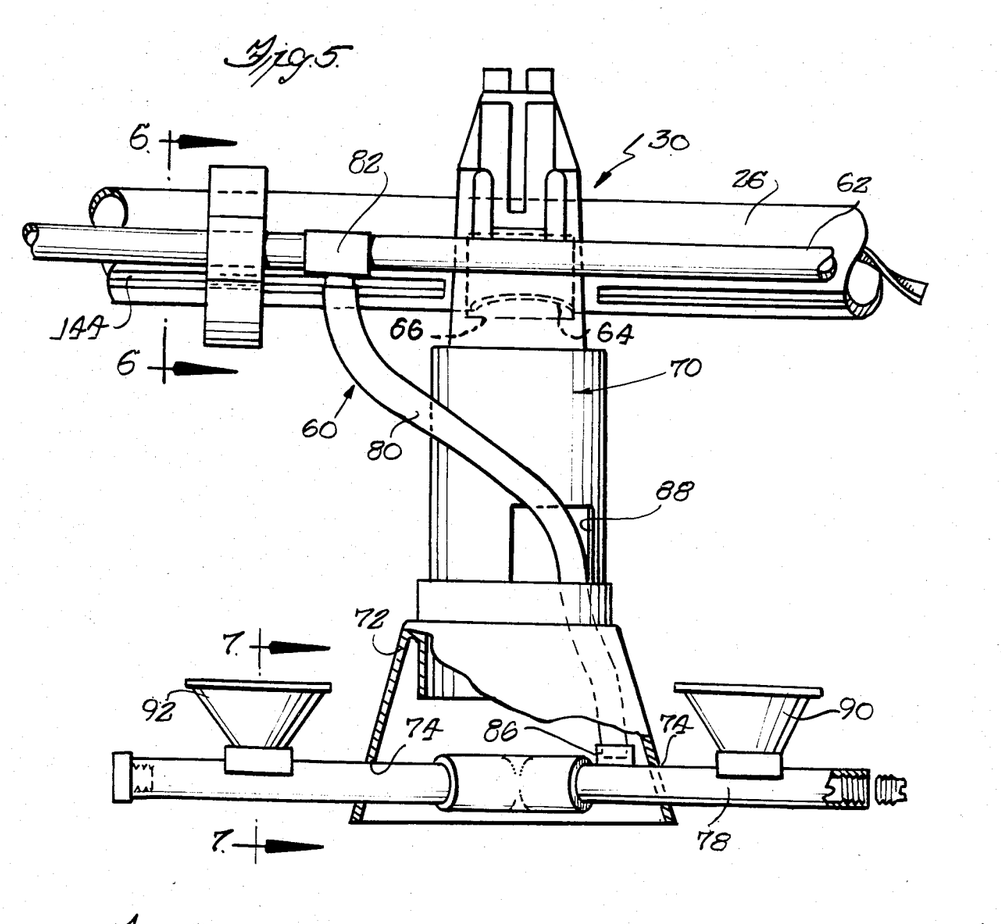
FIG. 5 is a fragmentary side elevational view in partial section showing the novel waterer structure in further detail.

The first embodiment of the water dispensing station 60 is illustrated in detail in FIGS. 3-5. To minimize the total system expense in accordance with the invention, the station 60 includes a support tube 70 carried by the feed conveyor 26, which is almost identical to the feeder pan unit drop tube 40. A skirt 72, similar to the feeder unit drop tube skirt 42, is provided with a series of apertures 74 through which extend a series of horizontally disposed water dispensing tubes 78. In the invention embodiment illustrated, four such tubes 78 are located outside an imaginary vertical plane passing through the feed conveyor 26 or the water line 62. This arrangement avoids obstruction and provides unlimited headroom to the drinking poultry.

Figures 8, 9:
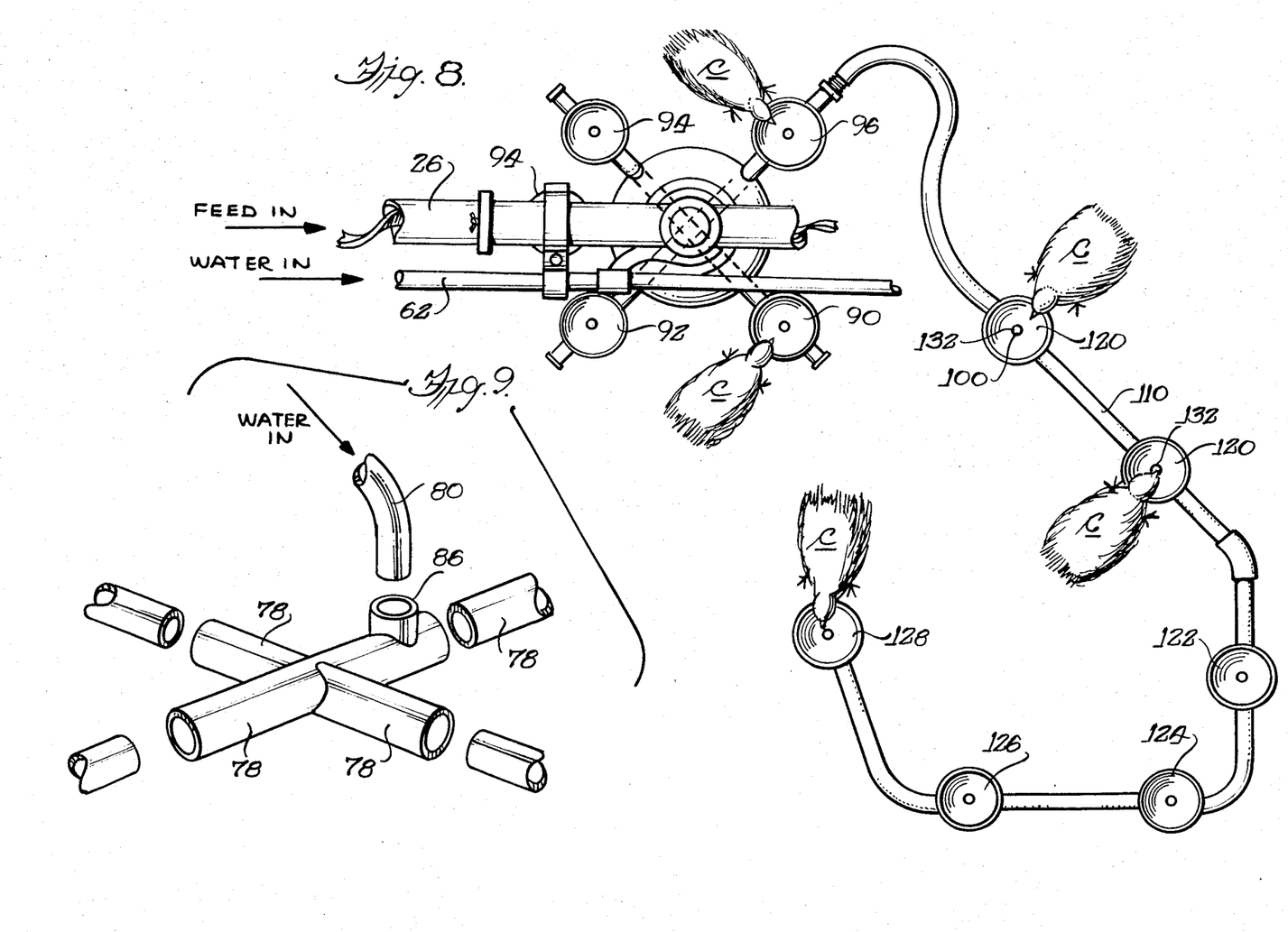
FIG. 8 is a fragmentary top plan view of a modified configuration of the waterer portion of the system.
FIG. 9 is a fragmentary exploded view showing in further detail the water conduit system forming a part of the waterer mechanism.

To direct water from the line 62 to the dispensing tubes 78, a water conduit 80 extends from a tee structure 82 down to the dispensing tubes 78, as illustrated particularly in FIGS. 5 and 9. A conduit/dispensing tube connection 86 can be conveniently located within the conical skirt 72, and the flexible drop conduit tube 80 can be passed through an aperture 88 which is like the feed brood gate opening 52 in the feeder drop tube 40. This arrangement protects water-connections from damage by the poultry.

A plurality of water-dispensing cups 90, 92, 94 and 96 are supported directly by the dispensing tubes 78 and, more indirectly, by the support tube device 70 and conveyor 26. To provide an appropriate level of water within the cups 90–96, a valve 100 is mounted in each cup, so as to be functionally interposed between the delivery tubes 78 and the cups 90–96. This valve can be of the type disclosed and claimed in U.S. Pat. No. 4,282,831.

In accordance with the invention, the water dispensing station 60 provides water to even immature chicks C. When the feeding and watering system is lowered to a down position such as that illustrated in FIG. 3 and the feeder units 30 are thus automatically configured for feed delivery to chicks C, it will be noted that the watering units 60 are also located in a down, chick-accommodating position. When the feeders 30 are raised to the adult-use position shown in FIG. 4, the watering units are automatically also raised a like amount, as suggested in FIG. 4. In the raised position, the cups 90–96 discourage the adult birds from climbing on the cups and polluting the water.

System lowering and raising is accomplished by the suspension sub-system 16. This suspension sub-system 16 includes a hoist arrangement 112, from which depend a number of hoist lines 114 connected to hanger brackets 116. The hanger brackets 116 can be of any convenient type, including that in U.S. patent application Ser. No. 383,464 filed June 1, 1982 and now sold by Chore-Time Equipment, Inc. of Milford, Ind. When a crank 118 or similar mechanism is operated, the hoist lines 114 raise and lower the conveyor tube 26, the attached water line 62, the feeder units 30, and the watering units 60 together with a single motion.

Figure 13:
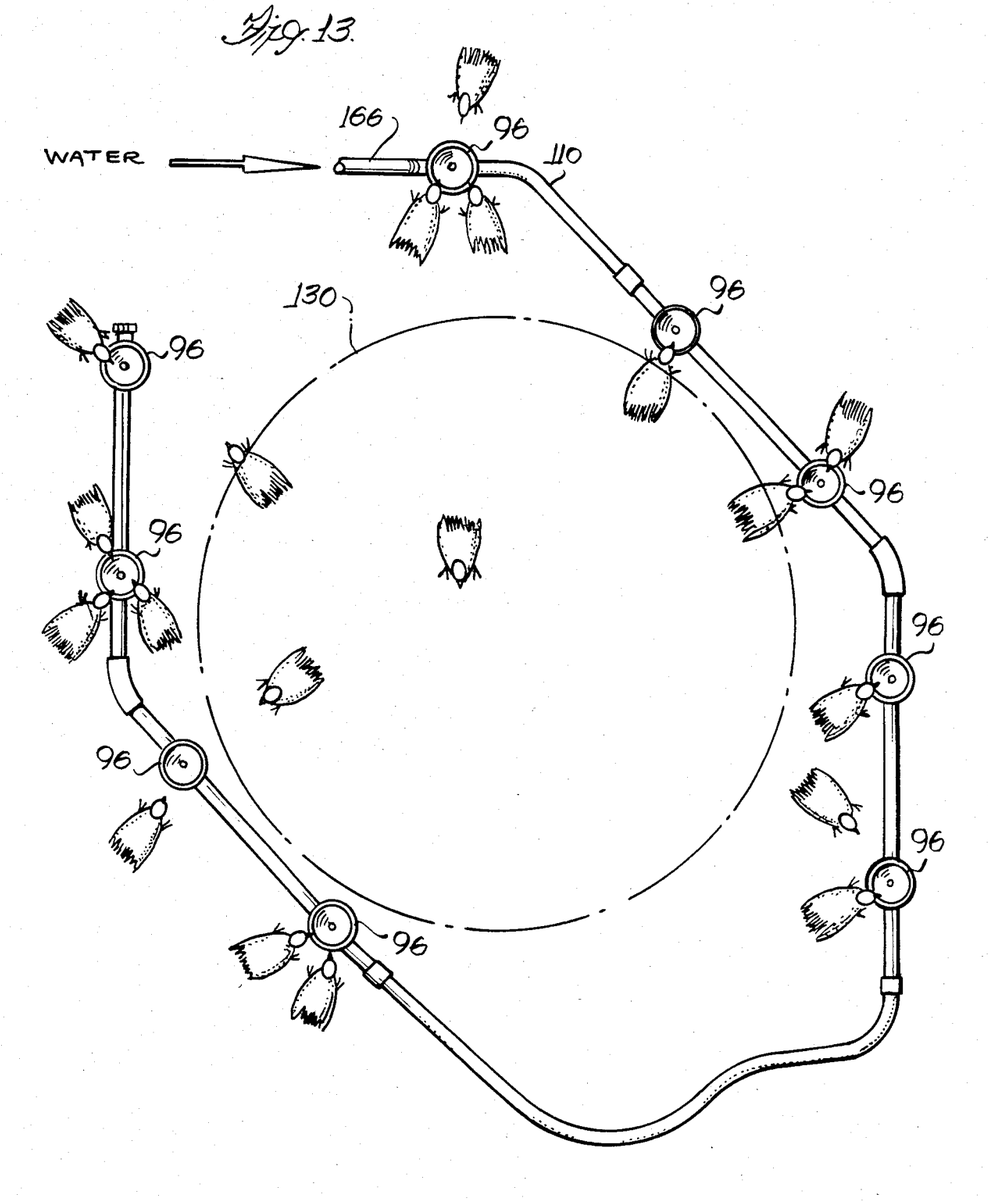
FIG. 13 is a fragmentary top plan view of another modified configuration of the waterer portion of the system.

To inexpensively yet effectively accommodate additional need for water in further accordance with the invention, the system can be easily provided with a satellite watering system connected to at least one of the watering stations 60, as suggested in FIGS. 1, 8 and 13. The illustrated satellite watering system can include a satellite water conduit 110 connected to and extending from the watering dispensing tube 78 as especially suggested in FIGS. 8 and 13. A suitable connection such as a union or nipple 112 can be provided, or the tube 78 can be internally threaded for a simple male-to-female-pipe-thread fit (FIG. 5).

Mounted along this satellite water conduit 110 are a series of water dispensing satellite cups 120. Preferably, this satellite water conduit 110 rests upon the ground, so as to locate the watering cups 120–128 at the lowest possible convenient elevation for the small chicks C. This pipe 110 and the cups 120–128 can be conveniently arranged so as to be located below a gentle heat source such as a brooder lamp 130 (FIG. 1) which keeps the young chicks warm and healthy.

Figure 7:
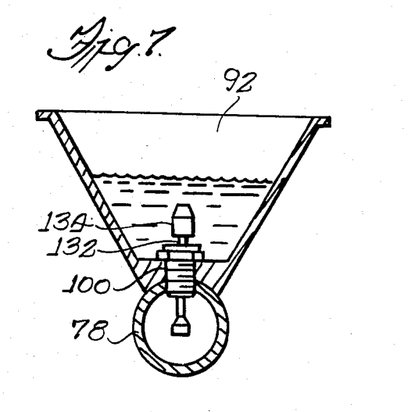
FIG. 7 is a fragmentary side elevational view taken substantially in the plane of line 7—7 in FIG. 5.

Each of these cups 120 can be like the cups 90–96, and each is provided a water delivery valve 122 to control the level of water in the cup. This water delivery valve can be of the form described in U.S. Pat. No. 4,282,831, or it can be of some other convenient type. So as to attract the young chicks, the illustrated trigger member 132 of each valve can be colored red so as to attract the poultry. In addition, a red float 134 can be detachably mounted to the trigger 132, as suggested in FIG. 7. After the chicks grow sufficiently, the satellite watering system can be removed and the waterers 60 and feeders 30 are raised to adult-service heights.

Figures 10, 11:
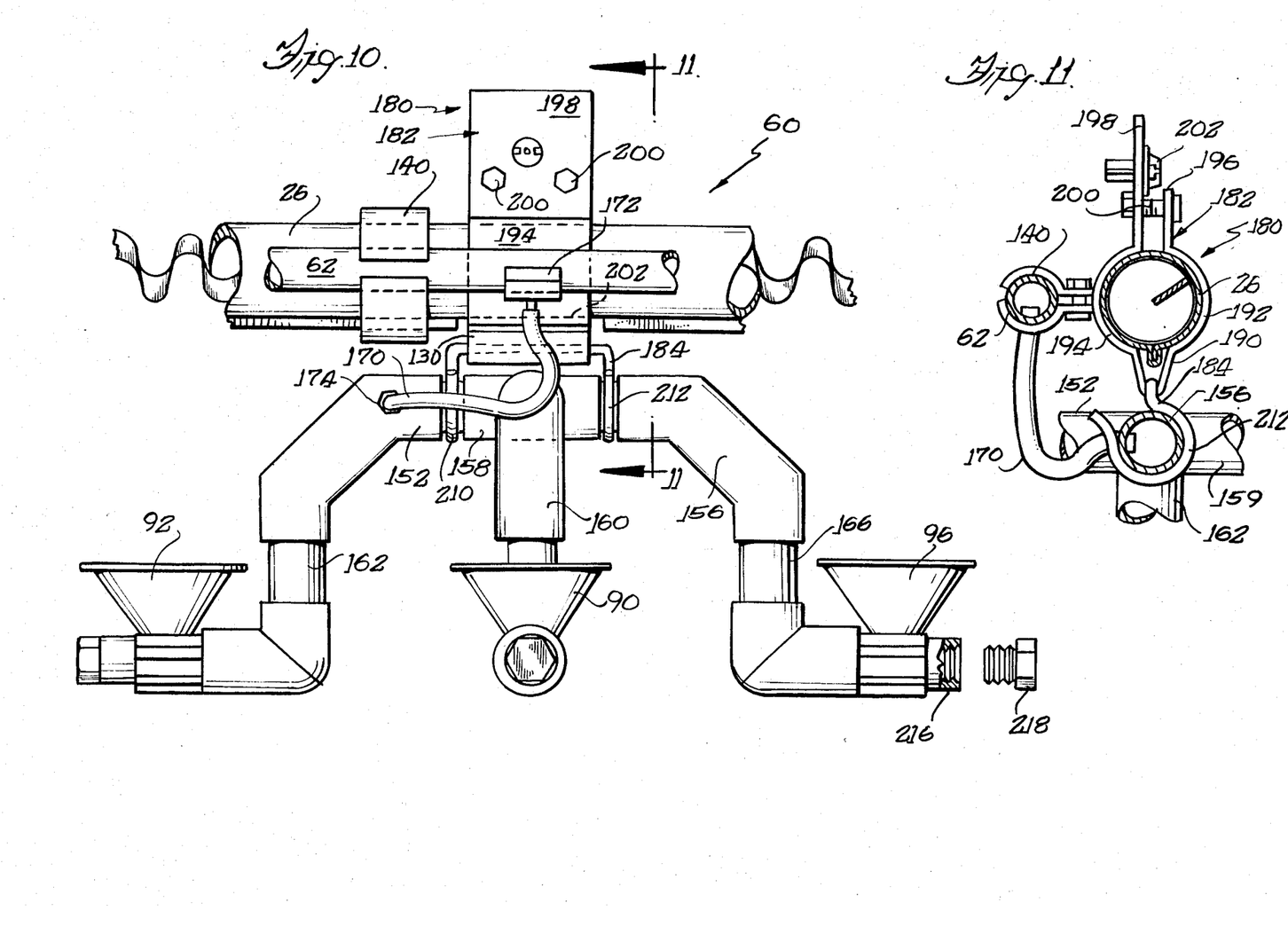
FIG. 10 is a side elevational view of an alternate embodiment of the watering apparatus.
FIG. 11 is a fragmentary sectional view taken substantially in the plane of line 11—11 in FIG. 10.
Figure 12:
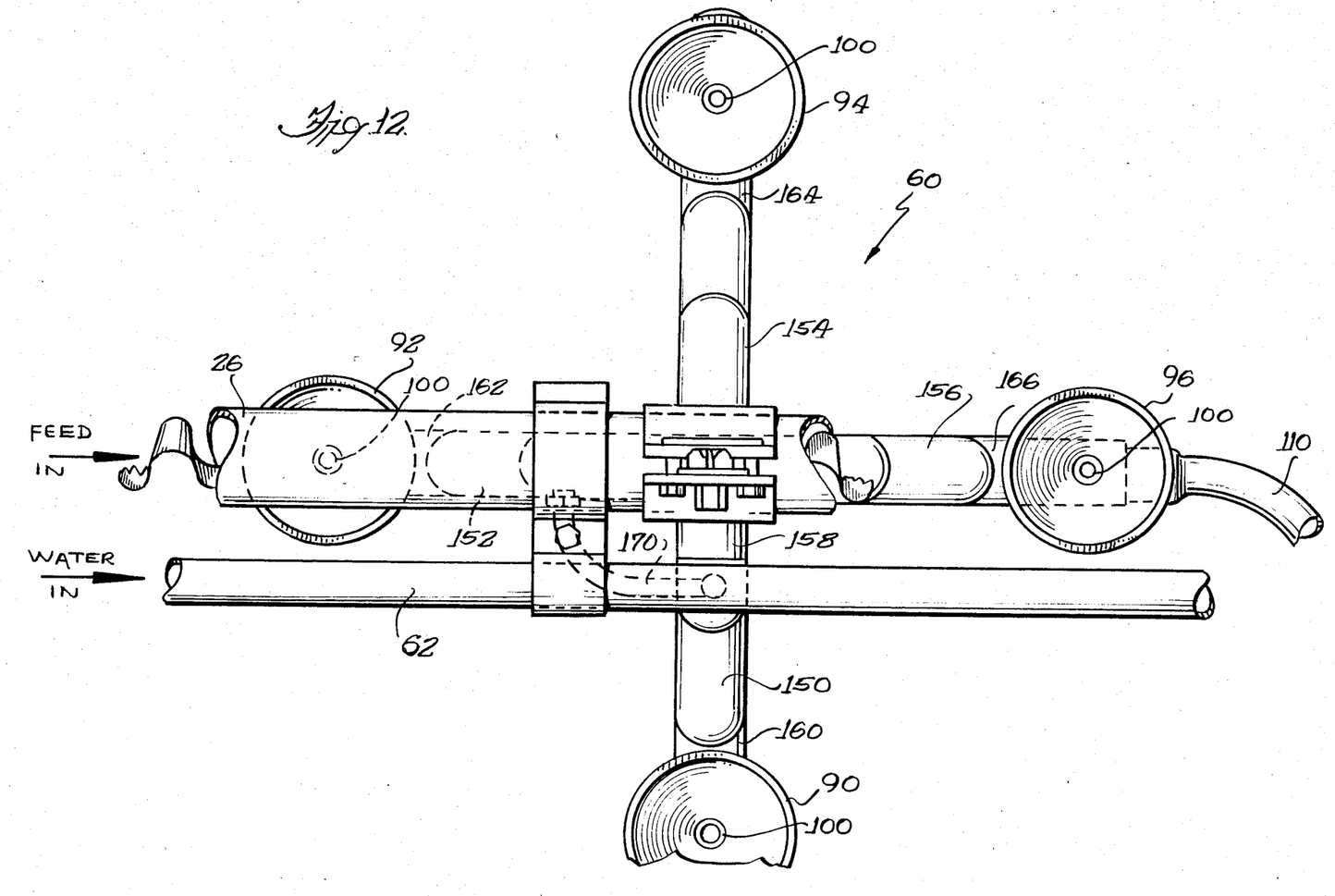
FIG. 12 is a fragmentary top plan view of the alternate embodiment apparatus shown in FIG. 10.

A second embodiment of the water dispensing station 60 is shown in FIGS. 10, 11 and 12. Here, water dispensing conduits or tubes 150, 152, 154 and 156 are arranged in a cross-shaped array, and meet at an intercommunicating center section 158. Each tube 150–156 is provided with a downwardly and outwardly extending distal portion 160, 162, 164 and 166, upon which are mounted the watering cups 90, 92, 94 and 96. To deliver water from the water line 62 to all these interconnected conduits 150–166, a flexible hose member 170 leads from a sleeve connection 172 on the water line 62 to a connection 174 provided on a convenient conduit leg 152.

This cup-and-conduit arrangement 90–166 is here suspended beneath the feed conveyor tube 26 so as to locate the water dispensing stations near the feeding station, in an array which is attractive to the poultry. To this end, a hanger assembly 180 is attached to the feed conveyor 26, and this hanger assembly 180 engages and supports the water conduit members 152, 156, as especially shown in FIGS. 10 and 11. Here, this hanger 180 comprises an upper clamp 182, and a bi-ended, hooked carrier 184 which depends from the clamp 182 to carry the water conduit arrangement by engagement with the conduits 152 and 156.

More specifically, this clamp 182 can be formed of a suitable plastic of the general type described elsewhere herein, and is heat formed or otherwise shaped so as to form a reversely folded center or bottom section 190 and opposed, curved, mediate sections 192 and 194 which are adapted to surround and engage the conveyor 26. Opposed distal flanges 196 and 198 extend upwardly from the flange sections 192 and 194. Bolts or other fasteners 200 can be disposed to extend between these flanges 196, 198 so as to draw the C-shaped portions toward and around the feed conveyor 26 in clamping engagement. If desired, an electrically insulating member 202 can be provided in one of the flanges 198 to support an anti-roost wire. Preferably, at least one of the clamp mediate sections 192 or 194 is of sufficient extent and is so positioned as to mask or wall off the feed drop-out hole 202 so as to prevent the loss of feed from the conveyor 26 at the watering station 60.

As suggested above, the hooked carrier member 184 is cradled in the bottom or center section 190 of the clamp 180. This carrier member 184 is provided at either end with depending hooks 210, 212 which, in turn, engage and cradle horizontally disposed interior portions 152, 156 of the conduit array. This arrangement permits the conduit array to pivot or swing slightly below the feed delivery conduit 26 and clamp 182. Such an arrangement permits easy and quick field assembly, and minimizes damage to the watering station 60 should any portion of the conduits or cups be bumped during system installation or removal, or pushed by the using poultry.

In the preferred embodiment, one of the distal legs 166 is provided with a threaded arrangement 216 and a covering cap 218. By removing the cap 218, the satellite watering system 110 can be attached, as suggested in FIGS. 10 and 12. This satellite system 110 is identical, of course, with the system described in association with the embodiment shown in FIG. 8.

The invention claimed is as follows:

1. A combined feeding and watering system for poultry or like animals which are free to roam about a ground area, the system comprising, in combination, an elongated feed conveyor, a plurality of discrete spaced feeder pan units disposed in a row along and connected to the feed conveyor and disposed to present feed to the poultry, an elongated water line extending along and adjacent the feed conveyor, and a plurality of spaced water dispensing units connected to said water line and disposed in said row and interposed between the feeder pan units to present water to the poultry, means for raising and lowering said feeder pan units and said water dispensing units in unison, wherein a feeder pan unit includes a pan having interior and exterior portions, and a drop tube, the feeder pan unit including feed flow director means for presenting feed at an exterior pan portion to small poultry when the feeder pan unit is in a lowered configuration, the water dispensing units also being at lowered positions to provide water to the small poultry, the feeder pan unit feed flow director means operating to present feed at an interior pan portion to large poultry when the feeder pan unit is in a raised configuration, the water dispensing units also being at raised positions to provide water to the large poultry.

2. A system according to claim 1 wherein a feeder pan unit includes a pan, and a drop tube for guiding feed from the feed conveyor to the pan, and wherein a water dispensing station includes a support tube similar to the feeder pan unit drop tube.

3. A system according to claim 1 further including suspension hoist means connected to the feed conveyor for raising and lowering the feed conveyor and water line together.

4. A system according to claim 1 wherein said feed flow director means includes slide means for permitting said pan to rest on said ground when said feeder pan unit is configured in either its raised or its lowered configurations.

5. A system according to claim 1 wherein said water dispensing stations each include a plurality of water-dispensing cups, the system further including drop conduit means extending from said water line through said feed flow director means to said cups.

6. A combined feeding and watering system for poultry or like animals which are free to roam about a floor space, the system comprising, in combination, an elongated feed conveyor, a plurality of discrete feeder pan units at predetermined spaced intervals disposed in a row along and connected to the feed conveyor and adapted to receive feed therefrom, an elongated water line extending along and generally adjacent to the feed conveyor, a plurality of water dispensing units connected to and adapted to receive water from the water line and respectively located between certain of said feeder units at intervals greater than said predetermined intervals, means for moving said feeder pan units and said water dispensing units as a group to and from upper and lower positions, and means including parts of said feeder pan units for configuring the feed in a first arrangement for presentation to small poultry when the units are at the lower position and for configuring the feed in a second and different arrangement for presentation of feed to large poultry when the units are at the upper position.

7. A system according to claim 1 or 6 wherein said system further comprises a satellite watering system connected to at least one of said water dispensing stations, the satellite watering system having a satellite water conduit in fluid communication with and extending from the water dispensing station, and a plurality of water dispensing satellite cups connected to the satellite water conduit.

8. A system according to claim 6 in which said means forming parts of said feeder pan units comprises structure that provides a first feed flow path through the unit in the upper position and a second feed flow path through the unit in the lower position.

9. A combined feeding and watering system for poultry and the like comprising, elongated feed conveyor conduit means, a plurality of discrete feeder pan units respectively connected to and depending from the conveyor conduit means at intervals of predetermined spacing, a water supply line extending along and supported with said conduit means, and a plurality of discrete watering units connected to said supply line and supported by and depending from said conduit means between certain of said feeder pan units at intervals of a second predetermined spacing, and means connected with said conduit means for supporting said feeder pan units and said watering units for up and down adjustment in unison for presenting feed and water to small poultry and alternatively to larger poultry and the like.

10. A system as defined in claim 9, wherein said second mentioned interval is larger than and substantially a multiple of the first mentioned interval whereby said system includes a larger number of said feeder units than said watering units.

11. A system as defined in claim 9, wherein each of said feeder pan units comprises a circular pan and each of said watering units includes a plurality of individual water cups arrayed in a circular pattern similar to the circular configuration of said pans.

12. A system as defined in claim 9, wherein said conduit means comprises feed dropout holes located at each of said first mentioned intervals along its length, and means covering each of said holes at each of said said second intervals to prevent the discharge of feed at said watering units.

13. A system as defined in claim 9, wherein each of said watering units comprises a hanger assembly secured to and depending from said conduit means, water conduit means disposed beneath said hanger assembly and including a central portion and a plurality of diverging portions radiating therefrom, water dispensing assemblies connected with each of said radiating portions, pivot means swingably connecting said water conduit means with said hanger assembly, and flexible means connecting said water conduit means and said water line.

14. A system as defined in claim 13, wherein said pivot means comprises a wire carrier member connected with said hanger assembly and including opposite end portions encircling said central portion of the water conduit means.

15. A watering unit for dispensing water to poultry and the like comprising, hanger means adapted to be secured to a support and to depend therefrom in a fixed position relative to the support, water conduit means connectable with a source of water and disposed beneath said hanger means, said water conduit means comprising a central pipe portion and a plurality of radiating portions extending from the central portion, pivot means engaging said central pipe portion and swingably connecting said central pipe portion with said hanger means for pivotal movement about a predetermined generally horizontal axis, each of said radiating conduit portions extending downwardly from said central portion and then generally horizontally at a level substantially below said central portion, and water dispensing means activated by the poultry and the like on each of said horizontally extending parts of the conduit means.

16. A watering unit as defined in claim 15, wherein said hanger means is adapted to be secured to tube means of a feed conveyor extending longitudinally in a predetermined direction, said pivot means comprising means for supporting the conduit means for pivotal movement only about an axis which is always substantially parallel to said predetermined direction, and said radiating conduit portions including at least two portions extending oppositely from said central portion in directions parallel to said predetermined direction.

* * * * *